United States Patent Office 3,264,223
Patented August 2, 1966

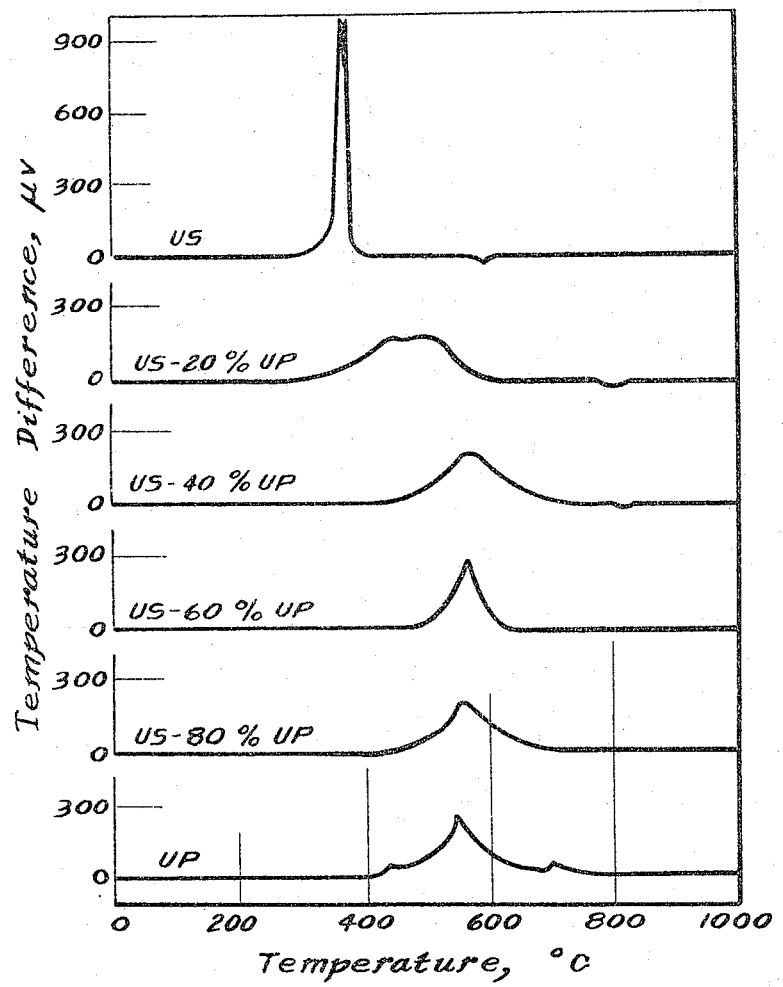

3,264,223
URANIUM MONOSULFIDE-URANIUM MONO-PHOSPHIDE SOLID SOLUTIONS
Yehuda Baskin, Chicago, and Peter D. Shalek, Champaign, Ill., assignors to the United States of America as represented by the United States Atomic Energy Commission
Filed June 25, 1964, Ser. No. 378,490
4 Claims. (Cl. 252—301.1)

The invention described herein was made in the course of, or under, a contract with the United States Atomic Energy Commission.

This invention relates to ceramic-type compositions of matter based on uranium compounds that are suitable as fuel for nuclear reactors.

Various high-melting uranium compounds have been investigated for use as nuclear reactor fuel. For instance, uranium monosulfide has been considered for this purpose. The sulfide, however, has certain drawbacks; it forms uranium oxysulfide, UOS, when heated in the presence of air. Uranium oxysulfide is rather volatile at elevated temperatures, which causes undesirably high losses; it also has a relatively low melting point which impairs its dimensional stability and has a disadvantageous effect on the sintering of the product. At 1800° C., the usual sintering temperature, the oxysulfide is liquid.

Another compound considered for the above-described purpose is the uranium monophosphide. This compound oxidizes considerably more slowly than the monosulfide, but it has some other drawbacks, namely it has a tendency to crack on sintering. The slower oxidation of the uranium monophosphide, it is believed, is due to the formation of a protective film containing $P_2O_5$ and/or uranium phosphate on the surface of the monophosphide.

It is an object of this invention to provide a ceramic-type nuclear uranium fuel that does not crack when heated.

It is another object of this invention to provide a ceramic-type nuclear uranium fuel that has a relatively low vapor pressure at the elevated temperatures at which it is exposed in a nuclear reactor.

It is finally also an object of this invention to provide a ceramic-type nuclear uranium fuel that has a small grain size and does not show grain growth during use in the reactor.

It was found that a mixture of uranium monosulfide and uranium monophosphide is superior in many respects to either the monosulfide or the monophosphide alone. Uranium monosulfide and uranium monophosphide form solid solutions with each other over the entire range of composition in the form of a crystalline mass pertaining to the face-centered cubic system. It was found that the uranium sulfide content has an effect on the melting point of the composition and that the highest melting point, 2600° C., is obtained with a composition containing about 30 w/o of uranium monosulfide. This melting point is higher than either that of uranium monosulfide (2450° C.) or of uranium monophosphide (2540° C.). (All these melting points were determined in an atmosphere of hydrogen to avoid any contamination by an oxygen-containing product.) It was furthermore found that the uranium sulfide content reduces the cracking tendency to a minimum up to a percentage of 80% by weight. Uranium oxysulfide is not formed in compositions that contain less than 80% of uranium monosulfide; they contain uranium dioxide as a second phase. Compositions having higher contents, however, do show uranium oxysulfide as a second phase. Uranium dioxide is preferable as a second phase to uranium oxysulfide, because there it ties up a lesser weight of uranium than in the oxysulfide; because it has a higher melting point (2800° C.) than the oxysulfide (1900° C.); and because it does not lower the melting point of uranium monosulfide as drastically as does the oxysulfide.

The product of this invention thus consists of a composition of matter formed of from 10 to 80% by weight of uranium monosulfide and from 90 to 20% by weight of uranium monophosphide. The preferred composition, on account of a high melting point, is that containing from 20 to 40 w/o of monosulfide, while the composition containing about 30% is the very best, as has been mentioned before.

Uranium monophosphide and uranium monosulfide can be made by any method known to those skilled in the art; their preparation is not part of this invention. For instance, the phosphide can be made by the reaction of phosphine, $PH_3$, with uranium powder, the latter obtained by hydriding and dehydriding uranium metal; a temperature of approximately 385° C. is suitable for this reaction. A homogenization treatment is then applied to the product consisting of heating at about 1400° C. in vacuum for about two hours. The uranium monosulfide can be prepared by the reaction of uranium powder and hydrogen sulfide at a temperature between 400 and 550° C.; here, too, the product is advantageously homogenized by heating for about two hours at 1900° C. in vacuum or in an inert atmosphere, for instance of argon gas.

The composition of matter of this invention is prepared by thoroughly mixing uranium monophosphide and uranium monosulfide powders in the ratio desired. While the particle size of the powders may vary widely, a grain size of about seven microns and about 2½ microns for the uranium sulfide and the uranium phosphide, respectively, have been used for the studies leading to this invention.

If a fuel element of predetermined shape is to be formed from the composition of matter of this invention, a binder is preferably added to the mixture. While any known binder that decomposes and/or volatilizes when heated can be used, the applicants found stearic acid particularly well suitable; a quantity of about 1% by weight of the sulfide-phosphide mixture was satisfactory. The mass is then shaped into bodies of desired configuration, and the bodies are heated at about 1800° C. in vacuum for aproximately two hours. At this temperature the binder is completely decomposed and/or volatilized, and the product consists of a solid solution of uranium monosulfide in uranium monophosphide or vice versa.

The specimens were examined metallographically, and the grain sizes, after two hours at 1800° C., were determined. Uranium monophosphide is fine-grained, uranium monosulfide coarse-grained. The new compositions containing less than 80% by weight of uranium monosulfide had an intermediate grain size, but much closer to that of uranium monophosphide than to that of uranium monosulfide.

The volatility and hardness of the binary compositions also show values intermediate between those of the pure components.

The oxidation behavior of the new composition of matter was compared with that of the uranium monophosphide and that of the uranium monosulfide by differential thermal analysis (DTA).

Curves were obtained automatically showing on the ordinate the temperature difference between the specimen and a control sample and on the abscissa the furnace temperature. These curves are shown in the accompanying drawing. It will be obvious that uranium monosulfide exhibited a sharp exothermic peak at 380° C., while uranium monophosphide exhibited several broad peaks, the one at 560° C. being the most pronounced. Addition of 20% of uranium monophosphide to uranium monosulfide shifted the exothermic peak of uranium monosulfide to 500° C. and broadened it considerably. A sample containing 40% of uranium monophosphide showed the major exothermic peak to be at 560° C., the same temperature as for pure uranium monophosphide. A composition containing 30% uranium monophosphide would be expected to have a peak somewhere between 500 and 560° C. The higher the peak temperatures and the less sharp the peaks are, the higher a resistance to oxidation is indicated.

It will be understood that the invention is not to be limited to the details given herein but that it may be modified within the scope of the appended claims.

What is claimed is:

1. As a new composition of matter, a sintered product formed of a solid solution of uranium monosulfide and uranium monophosphide.

2. The composition of matter of claim 1 wherein the solution consists of from 10 to 80% by weight of uranium monosulfide and from 90 to 20% by weight of uranium monophosphide.

3. The composition of matter of claim 2 wherein the uranium sulfide content is between 20 and 40% by weight, the remainder being uranium phosphide.

4. The composition of matter of claim 3 wherein the uranium monosulfide content is about 30% by weight.

References Cited by the Examiner

UNITED STATES PATENTS

| | | | |
|---|---|---|---|
| 3,122,509 | 2/1964 | Handwerk et al. | 252—301.1 X |
| 3,180,704 | 4/1965 | Baskin | 176—89 X |
| 3,194,745 | 7/1965 | Handwerk et al. | 252—301.1 X |

OTHER REFERENCES

AEC Documents: ANL–6784, June 1964, page 40; ANL–6868, September 1964, page 156.

L. DEWAYNE RUTLEDGE, *Primary Examiner.*